United States Patent [19]

Riley et al.

[11] 4,113,656

[45] Sep. 12, 1978

[54] HYDROTREATING CATALYST AND PROCESS UTILIZING THE SAME

[75] Inventors: Kenneth L. Riley, Baton Rouge; Lloyd A. Pine, Greenwell Springs, both of La.

[73] Assignee: Exxon Research & Engineering Co., Linden, N.J.

[21] Appl. No.: 773,427

[22] Filed: Feb. 28, 1977

Related U.S. Application Data

[62] Division of Ser. No. 644,835, Dec. 29, 1975, Pat. No. 4,069,139.

[51] Int. Cl.$^2$ .................. B01J 21/04; B01J 21/12; B01J 23/24; B01J 23/74
[52] U.S. Cl. .................. 252/439; 252/455 R; 252/465

[58] Field of Search .................. 252/465, 439, 455 R

[56] References Cited

U.S. PATENT DOCUMENTS

| 3,814,683 | 6/1974 | Christman et al. ............... 208/216 |
| 3,876,523 | 4/1975 | Rosinski et al. ............... 208/216 X |

*Primary Examiner*—W. J. Shine
*Attorney, Agent, or Firm*—Marthe L. Gibbons

[57] ABSTRACT

A catalyst is provided which comprises a hydrogenation component composited with an alumina-containing support. The catalyst has a median pore radius ranging from about 70 to about 95 Angstroms and a specified pore size distribution. A preferred catalyst is cobalt-molybdenum on alumina. Also provided is a hydrotreating process utilizing said catalyst.

9 Claims, No Drawings

HYDROTREATING CATALYST AND PROCESS UTILIZING THE SAME

This is a division of application Ser. No. 644,835, filed Dec. 29, 1975, now U.S. Pat. No. 4,069,139.

BACKGROUND OF THE INVENTION

1. Field of the Invention

This invention relates to a catalyst and process for hydrotreating of mineral oils. More particularly, this invention relates to an alumina-containing hydrotreating catalyst having a median pore radius ranging from about 70 to about 95 Angstroms and having a specified pore size distribution.

2. Description of the Prior Art

Hydrodesulfurization catalysts having specified pore size distribution have been proposed to overcome disadvantages of conventional prior art catalysts.

U.S. Pat. No. 3,876,523 discloses a hydrodematallization and hydrodesulfurization alumina base catalyst having an average pore diameter between 150 to 250 Angstroms (75 to 125 Angstrom radius).

U.S. Pat. No. 3,867,282 discloses a cobalt-monybdenum catalyst impregnated on a magnesium aluminate spinel support having a surface area greater than 50 m²/g and a pore volume greater than 0.3 cc/g.

U.S. Pat. No. 3,891,541 discloses a demetallization and desulfurization catalyst comprising a hydrogenation component composited with an alumina support, the pores of which are distributed over a narrow 180 to 300 Angstrom diameter (90 to 150 Angstrom radius) range and having a surface area in the range of 40 to 70 m²/g.

U.S. Pat. No. 3,393,148 discloses a hydroprocessing catalyst comprising a hydrogenation component and a large pore diameter alumina having a surface area ranging from 150 to 500 m²/g and an average pore diameter ranging from 100 to 200 Angstroms (50 to 100 Angstroms radius).

U.S. Pat. No. 3,471,399 discloses a hydrodesulfurization catalyst comprising silica-alumina and a hydrogenation component, said catalyst having an average pore diameter ranging from 70 to 90 Angstroms (35 to 45 Angstroms radius) and a surface area of about 150 to 250 square meters.

U.S. Pat. No. 3,322,666 discloses a hydrodesulfurization catalyst comprising a hydrogenation component and an activated alumina having less than 5 percent of its pore volume that is in the form of pores having a radius of 0 to 300 Å in pores larger than 100 Å radius and having less than 10 percent of the pore volume in pores larger than 80 Å radius.

U.S. Pat. No. 3,907,668 teaches hydrodesulfurization of a sulfur-containing asphaltene-free petroleum distillate with a catalyst having a specific pore size distribution.

None of these patents teaches the particular pore size distribution of the present invention.

SUMMARY OF THE INVENTION

In accordance with the invention there is provided, in a process for hydrotreating a sulfur and asphaltene containing hydrocarbon oil which comprises contacting said oil under hydrotreating conditions with hydrogen and a catalyst comprising an alumina-containing support composited with a hydrogenation component, said hydrogenation component comprising at least one Group VIB metal component and at least one Group VIII metal component, the improvement which comprises: said catalyst having a median pore radius ranging from about 70 to about 95 Angstroms, a total pore volume between 0.45 and 1.50 ml/g; less than 0.05 ml/g pore volume in pores with radii greater than 100 Angstroms; at least 0.40 ml/g pore volume in pores with radii between said median pore radius and from about 10 Angstroms above or below said median pore radius; at least 75 percent of the pore volume in pores with radii between said median pore radius and 10 Angstroms above or below said median pore radius; less than 0.05 ml/g of the pore volume in pores with radii below 60 Angstroms; and a total surface area ranging between 130 and 500 square meters per gram.

Furthermore, in accordance with the invention there is also provided a catalyst comprising an alumina-containing support composited with a hydrogenation component selected from the group consisting of at least one Group VIB metal component and at least one Group VIII metal component, said catalyst having a median pore radius ranging from about 70 to about 95 Angstroms, a total pore volume between 0.45 and 1.50 ml/g, less than 0.05 ml/g pore volume in pores with radii greater than 100 Angstroms; at least 0.40 ml/g pore volume in pores with radii between said median pore radius and from about 10 Angstroms above or below said median pore radius; at least 75 percent of the pore volume in pores with radii between said median pore radius and 10 Angstroms above or below said median pore radius; less than 0.05 ml/g of the pore volume in pores with radii below 60 Angstroms; and a total surface area ranging between 130 and 500 square meters per gram.

The pore radius referred to herein is determined using a Mercury Penetration Porosimeter Model 915-2 manufactured by Micromeritics Corporation, Norcross, Ga. The surface tension of the mercury was taken as 474 dynes per centimeter at 25° C. and a contact angle of 140° was used. The calculation of pore volume distribution is similar to that used by ORR, Powder Technology, volume 3, 1969–70, pages 117–123. By "median pore radius" is intended herein that 50% of the pore volume is above the given radius and 50% of the pore volume is below the given radius. By the expression "10 Angstroms above or below the median pore radius" is intended that the radius can be plus or minus 10 Angstroms from the actual median pore radius of the given catalyst.

DESCRIPTION OF THE PREFERRED EMBODIMENTS

A sulfur and asphaltene containing heavy hydrocarbon feedstock is contacted in a hydrotreating zone with hydrogen and the catalyst of the present invention under hydrodesulfurization conditions to produce a hydrocarbon product having a reduced content of sulfur. The catalyst of the invention is particularly suited for use when it is desired to desulfurize the asphaltene fraction of the feed to a level greater than 40% desulfurization, preferably to a level greater than 50% desulfurization, more preferably to a level greater than 70% desulfurization of the asphaltene fraction.

By "hydrotreating process" is intended herein the contacting of the hydrocarbon feed with a catalyst in the presence of hydrogen and under selected conditions to remove heteroatoms, such as sulfur, nitrogen, oxygen and metallic contaminants such as nickel, vanadium and iron, from the feedstock and/or to saturate aromatic hydrocarbons and/or olefinic hydrocarbons in the feedstock and/or to hydrocrack the feedstock. The process of the invention is particularly well suited for hydrodesulfurization and hydrodemetallization of asphaltene-containing heavy sulfur-bearing mineral oils which usually also contain a high content of metallic contaminants.

HEAVY HYDROCARBON FEEDSTOCKS

THE HYDROTREATING CATALYST

The hydrotreating catalyst of the present invention utilized in the hydrotreating zone comprises a hydrogenation component and an alumina-containing support.

The median pore radius of the hydrodesulfurization catalyst of the present invention will range broadly from about 70 to about 95 Angstroms. The hydrotreating catalyst of the present invention has the following physical characteristics shown in Table I.

TABLE I

CHARACTERIZATION OF CATALYST PORE SIZE DISTRIBUTION

|  | Broad Range | | Preferred | | More Preferred | |
| --- | --- | --- | --- | --- | --- | --- |
|  | Minimum | Maximum | Minimum | Maximum | Minimum | Maximum |
| Surface Area, m²/g | 130 | 500 | 132 | 200 | 135 | 175 |
| Pore Volume, ml/g | 0.45 | 1.50 | 0.48 | 1.00 | 0.50 | 0.60 |
| Median Pore Radius, A | 70 | 95 | 75 | 90 | 78 | 86 |
| Pore Volume Distribution |  |  |  |  |  |  |
| PV above 100 A Radius, ml/g | 0 | 0.050 | 0 | 0.040 | 0 | 0.035 |
| PV between $R_m \pm$ 10 A, ml/g | 0.40 | 1.00 | 0.41 | 0.80 | 0.42 | 0.60 |
| % PV between $R_m \pm$ 10 A, % | 75 | 99 | 80 | 98 | 81 | 96 |
| PV below 60 A Radius, ml/g | 0 | 0.050 | 0 | 0.40 | 0 | 0.035 |

The heavy hydrocarbon feedstocks utilized in the present invention comprise hydrocarbons boiling above 650° F. (at atmospheric pressure) which contain substantial quantities of material boiling above 1000° F. The process is particularly suited for treating sulfur- and asphaltene-containing hydrocarbon oils containing greater than 100 ppm nickel and vanadium contaminants. Suitable feeds include heavy crude mineral oils, residual petroleum oil fractions such as fractions produced by atmospheric and vacuum distillation of crude oil. Such residual oils usually contain large amounts of sulfur and metallic contaminants such as nickel and vanadium. Total metal content of such oils may range up to 2000 weight parts per million or more and the sulfur content may range to 8 weight percent or more. The Conradson carbon residue of these heavy hydrocarbon feeds will generally range from about 5 to about 50 weight percent (as to Conradson carbon, see ASTM Test D1890-65). The preferred process feedstock is a petroleum residuum obtained from distillation or other treating or separation process. From about 30 to about 100 percent of the petroleum residuum feed boils above 900° F. (at atmospheric pressure). Other suitable feedstocks include heavy hydrocarbons recovered from tar sand, synthetic crude oils recovered from oil shales, heavy oils produced from the liquefaction of coal, etc. The hydrocarbon feeds will generally contain at least 10 percent of materials boiling above 1000° F. (at atmospheric pressure).

OPERATING CONDITIONS IN THE HYDROTREATING ZONE

The operating conditions in the hydrotreating zone are summarized in the following table:

| Conditions | Broad Range | Preferred Range |
| --- | --- | --- |
| Temp., ° F. | 600–850 | 650–800 |
| Pressure, psig | 600–3500 | 800–3200 |
| Liquid Hourly Space Velocity, V/V/Hr. | 0.05–5.0 | 0.10–2.5 |
| Hydrogen Rate, SCF/bbl | 300–20,000 | 600–12,000 |
| Hydrogen Partial Pressure, psig | 500–3000 | 800–2500 |

The hydrotreating catalyst of the present invention comprises a hydrogenation component comprising a Group VIB metal component and a Group VIII metal component composited with a refractory support. A preferred hydrotreating catalyst comprises a hydrogenation component selected from the group consisting of at least one elemental metal, metal oxide, or metal sulfide of a Group VIB metal and at least one elemental metal, metal oxide or metal sulfide of a Group VIII metal wherein the Group VIB metal, calculated as the oxide thereof, based on the total catalyst, is present in an amount of at least 8 weight percent, preferably from about 8 to about 25 weight percent, more preferably from about 14 to 20 weight percent, and wherein the Group VIII metal component, calculated as the metal oxide, based on the total catalyst, is present in an amount of at least 2.5 weight percent, preferably from about 2.5 to about 15 weight percent, more preferably from about 3.5 to about 6.5 weight percent. The preferred Group VIB component is selected from the group consisting of molybdenum oxide, molybdenum sulfide, tungsten oxide and tungsten sulfide and mixtures thereof and a preferred Group VIII metal component is selected from the group consisting of nickel oxide, nickel sulfide, cobalt oxide, cobalt sulfide, and mixtures thereof. The oxide catalysts are preferably sulfided prior to use in a conventional way.

TABLE II

| Catalyst Composition | Broad Range | Preferred Range |
| --- | --- | --- |
| Nickel or cobalt as oxide, wt. % | 2.5–15 | 3.5–6.5 |
| Tungsten or molybdenum as oxide, wt. % | 8–25 | 14–20 |
| Alumina | Balance | Balance |

The catalyst may be prepared in a conventional manner, for example, by impregnating an alumina-containing support having the desired physical characteristics with salts of the desired hydrogenation metals. Methods for preparing the alumina supports are well known in the art. The alumina support may further contain minor amounts of silica.

The following examples are presented to illustrate the present invention. All the catalysts utilized in the experiments described in the examples were sulfided in a conventional manner before being tested. The tests were conducted at 2000 psig hydrogen pressure and a gas rate of 3000 SCF per barrel. The respective comparative runs were made at the same space velocity.

EXAMPLE 1

Comparative runs were conducted utilizing a conventional prior art catalyst and a catalyst in accordance with the present invention. The characteristics of the catalysts designated herein Catalysts A and B are tabulated in Table III. Catalyst A is a conventional catalyst. Catalyst B is a catalyst in accordance with the present invention.

A Safaniya atmospheric residuum (Heavy Arabian) containing 3.6 weight percent sulfur was passed in upward flow through a fixed bed of extrudates of Catalyst A comprising approximately 4 weight percent CoO and 12 weight percent $MoO_3$ and having the characteristics shown in Table III. The characteristics of this atmospheric residuum are given in Table IV. A run was carried out such that after sulfiding the catalyst, the residuum feedstock was added to the reactor, feed rate, pressure and gas rate set, and the temperature adjusted each day to maintain approximately 1.0 weight percent product sulfur.

Note that of the 3.61 weight percent sulfur in the feed, approximately 1.47 weight percent was in the asphaltene (pentane-insoluble fraction). Hence, a 1.0 weight percent product sulfur will represent 32.0 percent desulfurization of the asphaltene fraction, assuming that all of the non-asphaltene sulfur was preferentially removed before removal of the sulfur from the asphaltenes.

TABLE III

| CATALYST INSPECTIONS | | |
|---|---|---|
| Catalyst No. | A | B |
| Chemical Composition: | | |
| % CoO (NiO) | 4.0 | 4.5 |
| % $MoO_3$ | 12.0 | 16.0 |
| % $SiO_2$ | 1.0 | — |
| % $Al_2O_3$ | Bal. | Bal. |
| Physical Properties: | | |
| BET Surface Area, $m^2/g$ | 270 | 137 |
| Total Pore Volume, ml/g | 0.47 | 0.525 |
| Pore Size Distribution: | | |
| Median Pore Radius, A | 35 | 84 |
| Pore Volume Distribution: | | |
| P.V. above 100 A Radius, ml/g | 0.02 | 0.025 |
| P.V. between $R_m \pm 10$ A, ml/g | 0.435 | 0.435 |
| % P.V. between $R_m \pm 10$ A | 92.6 | 82.9 |
| P.V. below 60 A Radius, ml/g | 0.44 | 0.015 |

TABLE IV

| FEEDSTOCK INSPECTIONS | |
|---|---|
| Feedstock No. | Safaniya Atmospheric Residuum 1 |
| Gravity, API at 60° F. | 13.9 |
| Sulfur, Wt. % | 3.61 |
| Carbon, Wt. % | 84.92 |
| Hydrogen, Wt. % | 11.14 |
| Nitrogen, Wt. % | 0.269 |
| Oxygen, Wt. % | — |
| Conradson Carbon, Wt. % | 12.0 |
| Aniline Pt., ° F. | — |
| RI at 67° C. | — |
| Bromine No., gm/100 gm | 5.9 |
| 1160 ASTM Distillation at 1 mm | |
| IBP, ° F. | 445 |
| 5% at ° F. | 584 |
| 10% at ° F. | 642 |
| 20% at ° F. | 743 |
| 30% at ° F. | 829 |
| 40% at ° F. | 901 |
| 50% at ° F. | 995 |
| 60% at ° F. | — |
| 70% at ° F. | — |
| 80% at ° F. | — |
| 90% at ° F. | — |
| 95% at ° F. | — |
| FBP, ° F. | 1050 |
| Rec., % | 58 |
| Res., % | 42 |
| V, ppm | 88 |
| Ni, ppm | 20 |
| Fe, ppm | 4 |
| Asphalt, $C_5$ Insoluble, Wt. % | 21.6 |
| Sulfur in asphaltene fraction, Wt. % | 6.80 |

A similar experiment was conducted with catalyst B which is a catalyst in accordance with the present invention.

Results of these experiments are shown in Table V, where catalyst activity is represented as the temperature required above base conditions to achieve the desired desulfurization level. Since catalyst A required a substantially lower temperature than catalyst B, it can be seen that catalyst A was more active. Furthermore, catalyst A deactivated at a substantially lower rate than catalyst B.

TABLE V

| Catalyst | A | B |
|---|---|---|
| Temperature, ° F. above base | | |
| at day 1 | 19 | 19 |
| at day 5 | 19 | 32 |
| at day 10 | 19 | 35 |
| at day 20 | 19 | 38 |
| at day 30 | 19 | 41 |

EXAMPLE 2

A similar pair of experiments was carried out with catalyst A and catalyst B at a lower feed rate and the temperature was adjusted each day to maintain approximately 0.3 weight percent product sulfur.

If it is assumed that all of the non-asphaltenic sulfur is preferentially removed before conversion of the sulfur in the asphaltenes, this would represent a 79.6% desulfurization of the asphaltene fraction. The results of these experiments are summarized in Table VI.

TABLE VI

| Catalyst | A | B |
|---|---|---|
| Temperature, ° F. above base | | |
| at day 5 | 45.0 | 34.2 |
| at day 10 | 50.4 | 37.8 |
| at day 20 | 57.6 | 49.0 |
| at day 30 | 63.0 | 56.0 |
| at day 40 | 72.0 | 63.0 |

It is surprising that catalyst B was now more active than catalyst A, as represented by the lower temperature required above base conditions to achieve the desired desulfurization level at corresponding times.

EXAMPLE 3

A light Arabian 1050° F. + vacuum residuum containing about 4 weight percent sulfur was used in evaluating and comparing catalyst A and catalyst B. The feed was passed in downward flow through a fixed bed of extrudates. The characteristics of this vacuum residuum are given in Table VII.

TABLE VII
FEEDSTOCK INSPECTIONS

| Feedstock No. | Light Arabian 1050° F. plus Vacuum Residuum 2 |
|---|---|
| Gravity, API | 6.7 |
| Sulfur, Wt. % | 4.03 |
| Carbon, Wt. % | 85.37 |
| Hydrogen, Wt. % | 9.91 |
| Pour Point, ° F. | 118.00 |
| Conradson Carbon, Wt. % | 24.86 |
| Iron, ppm | 6.6 |
| Nickel, ppm | 26.6 |
| Vanadium, ppm | 100.7 |
| Asphaltenes (pentane-insoluble), Wt. % | 25.4 |
| Sulfur in asphaltene fraction, Wt. % | 5.62 |

The runs were carried out in a similar way as in the previous examples except that the temperature was adjusted each day to maintain approximately 0.85 weight percent product sulfur. Of the 4.03 weight percent sulfur in the feed, approximately 1.43 weight percent was in the asphaltene (pentane-insoluble) fraction. Therefore, a 0.85 weight percent product sulfur represents 40.6 percent desulfurization of the asphaltene fraction, if it is assumed that all of the non-asphaltene sulfur is removed before sulfur removal begins in the asphaltene fraction.

The results of these experiments are summarized in Table VIII.

TABLE VIII

| Catalyst | A | B |
|---|---|---|
| Temperature, ° F above base | | |
| at day 5 | 29 | 21 |
| at day 10 | 35 | 32 |
| at day 25 | 40 | 40 |
| at day 50 | 52 | 43 |
| at day 75 | 79 | 46 |

During the first 25 days on oil, both catalysts A and B exhibited about the same activity. However, after about 50 days, catalyst B was substantially more active than catalyst A and this trend was increased even further after 75 days on oil.

What is claimed is:

1. A catalyst comprising an alumina support composited with a hydrogenation component comprising at least one Group VIB metal component selected from the group consisting of at least one elemental metal, metal oxide or metal sulfide of a Group VIB element of the Periodic Table of Elements and at least one Group VIII metal component selected from the group consisting of at least one elemental metal, metal oxide or metal sulfide of a Group VIII metal of the Periodic Table of Elements, said catalyst having a median pore radius ranging from about 70 to about 95 Angstroms, a total pore volume between 0.45 and 1.50 ml/g; less than 0.05 ml/g of said pore volume being in pores with radii greater than 100 Angstroms; at least 0.40 ml/g of said pore volume being in pores with radii in the range between said median pore radius to about 10 Angstroms above and 10 Angstroms below said median pore radius; at least 75 percent of said pore volume being in pores with radii in the range between said median pore radius to about 10 Angstroms above and 10 Angstroms below said median pore radius; less than 0.05 ml/g of said pore volume being in pores with radii below 60 Angstroms, and a total surface area ranging between 130 and 500 square meters per gram.

2. The catalyst of claim 1 wherein said catalyst has the following physical characteristics:

| | |
|---|---|
| Surface Area, m²/g | 130 to 500 |
| Pore Volume, ml/g | 0.45 to 1.50 |
| Median Pore Radius, Å | 70 to 95 |
| Pore Volume Distribution | |
| PV above 100 Å radius, ml/g | 0 to 0.05 |
| PV between $R_m$ + 10 Å above and 10Å below, ml/g | 0.40 to 1.00 |
| % PV between $R_m$ ± 10 Å, % | 75 to 99 |
| PV below 60 Å radius, ml/g | 0 to 0.05 |

3. The catalyst of claim 1 wherein said catalyst has the following physical characteristics:

| | |
|---|---|
| Surface Area, m²/g | 132 to 200 |
| Pore Volume, ml/g | 0.48 to 1.00 |
| Median Pore Radius, Å | 75 to 90 |
| Pore Volume Distribution | |
| PV above 100 Å radius, ml/g | 0 to 0.04 |
| PV between $R_m$ ± + 10 Å above and 10 Å below, ml/g | 0.41 to 0.80 |
| % PV between $R_m$ ± 10 Å, % | 80 to 98 |
| PV below 60 Å radius, ml/g | 0 to 0.04 |

4. The catalyst of claim 1 wherein said catalyst has the following physical characteristics:

| | |
|---|---|
| Surface Area, m²/g | 135 to 175 |
| Pore Volume, ml/g | 0.50 to 0.60 |
| Median Pore Radius, Å | 78 to 86 |
| Pore Volume Distribution | |
| PV above 100 Å radius, ml/g | 0 to 0.035 |
| PV between $R_m$ + 10 Å above and 10 Å below, ml/g | 0.42 to 0.60 |
| % PV between $R_m$ + 10 Å above and 10 Å below, % | 81 to 96 |
| PV below 60 Å radius, ml/g | 0 to 0.035 |

5. The catalyst of claim 1 wherein said Group VIB metal, calculated as the oxide thereof, comprises at least 8 weight percent of the total catalyst and wherein said Group VIII metal (calculated as the oxide thereof) comprises at least 2.5 weight percent of the total catalyst.

6. The catalyst of claim 1, wherein said Group VI metal, calculated as the oxide thereof, comprises from about 14 to 20 weight percent of the total catalyst and wherein said Group VIII metal, calculated as the oxide thereof, comprises from about 3.5 to about 6.5 weight percent of the total catalyst.

7. The catalyst of claim 1 wherein said Group VIB metal component is selected from the group consisting of molybdenum oxide, molybdenum sulfide, tungsten oxide, tungsten sulfide and mixtures thereof and wherein said Group VIII is selected from the group consisting of nickel oxide, cobalt oxide, nickel sulfide, cobalt sulfide and mixtures thereof.

8. The process of claim 1 wherein said alumina support contains minor amounts of silica.

9. The process of claim 1 wherein said catalyst consists essentially of a Group VIB metal component selected from the group consisting of molybdenum oxide, molybdenum sulfide, tungsten oxide, tungsten sulfide and mixtures thereof and a Group VIII metal component selected from the group consisting of nickel oxide, cobalt oxide, nickel sulfide, cobalt sulfide and mixtures thereof composited with an alumina support.

* * * * *